Feb. 17, 1970  R. A. GREENWALL, JR  3,496,421
OVERLOAD-PROTECTED MULTIPLE CIRCUIT ELECTRICAL SWITCHBOARD
Filed Aug. 1, 1968

INVENTOR.
ROBERT A. GREENWALL, Jr.

BY *Mallinckrodt and Mallinckrodt*

ATTORNEYS

# United States Patent Office 3,496,421
Patented Feb. 17, 1970

3,496,421
OVERLOAD-PROTECTED MULTIPLE CIRCUIT ELECTRICAL SWITCHBOARD
Robert A. Greenwall, Jr., Salt Lake City, Utah, assignor to BJ Management Corporation, Salt Lake City, Utah, a corporation of Utah
Filed Aug. 1, 1968, Ser. No. 749,544
Int. Cl. H02b 1/04, 1/02, 11/00
U.S. Cl. 317—112                                    8 Claims

ABSTRACT OF THE DISCLOSURE

A multiple circuit switchboard is protected against overload by closely coupled circuit breakers. A standard type of multiple circuit switchboard, having a plurality of circuit selectors movable to selected circuit-making positions while maintaining constant contact with respective rail-like conductors, has these conductors shaped and extended alternately at opposite ends thereof for connection with respective circuit breakers of standard type, which are secured to the switchboard in closely coupled relationship with the switching circuits.

BACKGROUND OF THE INVENTION

Field

The invention relates to multiple circuit electrical switchboards of the type originally disclosed by Ariel Davis in his U.S. Patent No. 2,796,473, dated June 18, 1957 (reissued Jan. 13, 1959 as Re. 24,586), wherein a plurality of circuit selector switches are movable in parallel from electrical contact to electrical contact along the lengths of respective electrical conductors serving as rails along which the individual switches are moved.

State of the art

This Ariel Davis type of multiple circuit electrical switchboard has for many years been connected into control panels by wiring that extends to remotely located circuit breaking devices. Not only is it time consuming to make the connections, but it is difficult to determine which circuit is which in instances where one or more circuits are broken by reason of overload.

SUMMARY OF THE INVENTION

The invention provides, in a most economical and advantageous manner, closely coupled circuit breakers for the respective switches in an Ariel Davis type of multiple circuit electrical switchboard, thereby integrating the necessary circuit breakers into the switchboard itself so they are always closely at hand, positionally keyed to the respective switches.

In accordance with the invention, the conductor rails of the switchboard are extended lengthwise at their power connection ends and are turned downwardly and then outwardly, preferably in right angle bends, respectively, to provide power connections below conductor rail level. Additionally, the switchboard base is extended below the extended rail ends and individual circuit breaker units are secured to the base extension and are electrically connected directly to the respective extended rail ends. Electrical power connections are made to the respective circuit breakers at their opposite ends in the usual manner.

In most embodiments, alternate sets of rails will be extended at respectively opposite ends of the switchboard, as will the base of the switchboard to receive and hold the circuit breakers; also, the divider strips or partition walls that serve as guides between and separating the several movable switches will be extended to abut the circuit breaker housings and protectively enclose the extended rail ends laterally thereof.

DESCRIPTION OF THE DRAWING

In the drawing, which shows what is presently contemplated as the best mode of carrying out the invention.

DETAILED DESCRIPTION OF THE ILLUSTRATED EMBODIMENT

Figure 1:
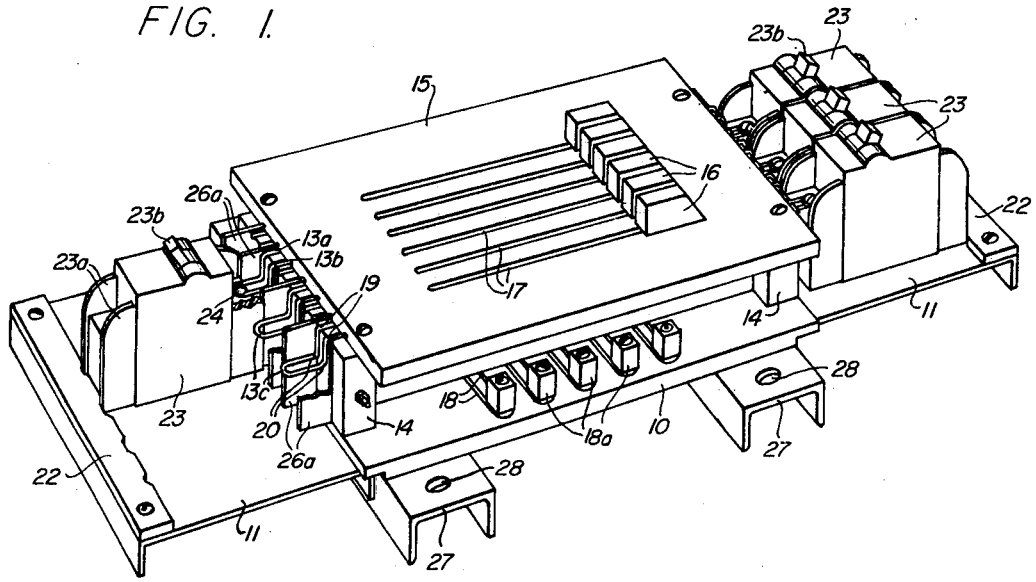
FIG. 1 is a pictorial view looking down on a switchboard of the invention from one end and one side thereof, some of the circuit breakers at one end having been removed for convenience of illustration.
Figure 2:
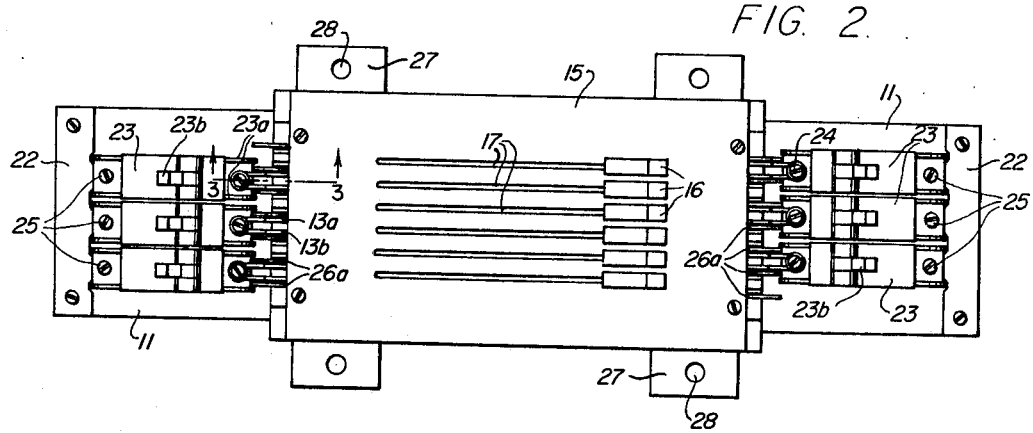
FIG. 2, a plan view of the switchboard, with all circuit breakers in place.
Figure 3:
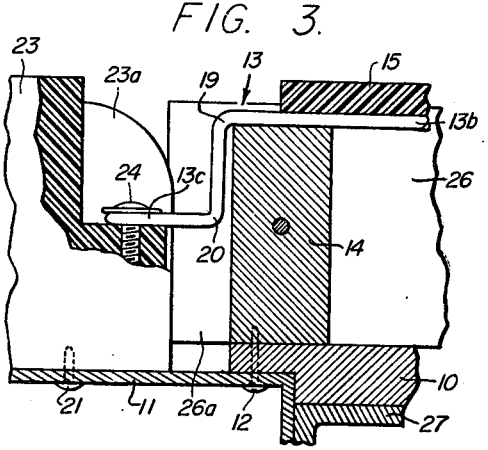
FIG. 3, an enlarged fragmentary view partly in vertical section taken on the line 3—3 of FIG. 2 and partly in elevation.

In the particular form illustrated, the base panel 10 of the switchboard is extended at both ends by the addition of a metal panel extension, here shown as a plate 11 of broad U-formation. For this purpose, opposite ends of the panel of electrical insulating material constituting the base 10 are rabbeted at the bottom, as illustrated, to snugly receive the plates 11 and such plates are screwed to the base from the bottom, see 12, FIG. 3.

The conductor rails 13 are in the usual form, being made of heavy wire bent to provide elongate parallel legs 13a and 13b which are joined at one end by a loop 13c. These are supported by opposite end walls 14 immediately below a top panel 15, all being fabricated from insulating material. Individual switches 16 are mounted within the switchboard in customary manner, with their operating handles extending through elongate slots 17 of the top panel 15 to enables manual movement of such switches back and forth along the respective conductor rails 13 so as to establish multiple circuit contacts with respective buss bars 18 that extend transversely of the rails on base panel 10 and that are provided with respective binding posts 18a for electrical connection with respective utility circuits.

In accordance with the invention, the loop end portions of the conductor rails 13 are extended and bent downwardly, at 19, and then outwardly, at 20, both being preferably at right angles, as shown, to place their horizontal loop connection terminal portions 13c below conductor rail level.

Fastened to the base extension plates 11 of the switchboard base 10, as by means of screws 21 and screwed-on, indentured end strips 22, are circuit breaker units 23 of a type having recessed binding posts 24 and 25 at opposite ends thereof protected laterally by upstanding side walls 23a. These units 23 may be and preferably are of standard make, e.g., sold by Heinamann Electric Co. under the catalog designation O911–12. They are provided with customary toggle switch levers 23b adapted to be thrown automatically upon the occurrence of circuit-breaking overload and to be thrown back to circuit-make positions manually.

As a practical matter, base extension plates 11 are recessed into base plate 10 sufficiently to adjust the level of binding posts 24 to the level of the terminal portions 13c of the conductor rails 13, it being realized that the circuit breaker units 23 are stock items, that the conductor rails will be pre-bent in large numbers as a manufacturing procedure, and that the base structure may vary from installation to installation.

It can be seen that electrical connections between the circuit breaker units 23 and the conductor rails 13 of the switchboard proper are easily made and that they closely couple the breaker units to the switchboard in a most advantageous, switch-correlated manner. To complete isolation of the individual electrical connections thus formed, the customary divider strips or partition walls 26 between the individual switches 16 are extended, as at 26a, through corresponding slots in the end walls 14 to abut the housings of the respective breaker units 23. As such, they protectively enclose the extended conductor rail ends, laterally thereof.

The base 10 of the switchboard is advantageously fastened to mounting structure, here shown as transversely-extending channels 27, to facilitate attachment to a control panel (not shown) usually provided as part of the installation. For this purpose, screws or bolts (not shown) are passed through receiving holes 28 in opposite ends of such channels 27.

Whereas this invention is here specifically illustrated and described with respect to a particular embodiment thereof, it is to be realized that various changes may be made within the generic purview of the disclosure without departing from the claimed subject matter.

I claim:

1. A multiple circuit electrical switchboard with correlated overload protection, comprising a base panel; a top panel overlying said base panel and spaced upwardly therefrom; a series of elongate electrical conductors extending in mutually spaced, side-by-side, parallel relationship along and immediately below said top panel as rails for respective movable switch units; a second series of elongate electrical conductors extending in mutually spaced, side-by-side, parallel relationship along said base panel transversely of the said rails for selective circuit-make contact by said switch units; a plurality of movable switch units corresponding in number to the number of said rails and arranged in electrical contact with respective rails for movement therealong so as to make contact with selected ones of the transversely extending series of electrical conductors; a base panel extension at at least one of the ends of said base panel that correspond to the ends of said rails; a plurality of circuit breaker units corresponding in number to the number of said rails and mounted on said panel extension in close adjacency to said ends of the rails, said ends of the rails being directly electrically connected to the respective circuit breakers; and means securing said circuit breakers to the panel extension on which they are mounted.

2. A multiple circuit electrical switchboard according to claim 1, wherein there is a base panel extension for the switchboard at both ends of the base panel that correspond to the ends of the rails; and wherein the circuit breaker units are mounted on both of the panel extensions and are electrically connected to alternate rails.

3. A multiple circuit electrical switchboard according to claim 1, wherein the rails are each formed as an elongate and narrow open loop and the circuit breaker units each have a binding post connection for a rail, each of the rails having its loop end electrically connected to the binding post of a circuit breaker unit.

4. A multiple circuit electrical switchboard according to claim 1, wherein the electrical connection for each circuit breaker unit is at a level below rail level, and each rail has its end that connects with a circuit breaker bent downwardly to place the connecting portion of such end at said connection level.

5. A multiple circuit electrical switchboard according to claim 4, wherein the bent rail ends have double bends, each at substantially right angles.

6. A multiple circuit electrical switchboard according to claim 4, wherein the switchboard additionally includes divider strips extending along and between the rails to electrically isolate the individual rails, and wherein said divider strips extend to abutment against the corresponding circuit breaker units to electrically isolate the portions of the rails that extend into connection with said breaker units.

7. A multiple circuit electrical switchboard according to claim 6, wherein each of the circuit breaker units has its electrical connection for the rail end recessed below rail level and electrically isolated by walls laterally thereof.

8. A multiple circuit electrical switchboard according to claim 1, wherein the circuit breaker securing means includes an indentured holding strip arranged to accommodate ends of the individual circuit breaker units.

References Cited

UNITED STATES PATENTS 2,796,473    6/1957    Davis _____ 200—16

LEWIS H. MYERS, Primary Examiner

G. P. TOLIN, Assistant Examiner

U.S. Cl. X.R.

317—119